United States Patent
Wang et al.

(10) Patent No.: US 11,457,317 B2
(45) Date of Patent: Sep. 27, 2022

(54) SPEAKER

(71) Applicant: GOERTEK INC., Shandong (CN)

(72) Inventors: Ting Wang, Shandong (CN); Guodong Zhao, Shandong (CN); Jie Zhu, Shandong (CN); Chun Li, Shandong (CN); Chunfa Liu, Shandong (CN)

(73) Assignee: Goertek Inc., Weifang (CN)

( * ) Notice: Subject to any disclaimer, the term of this patent is extended or adjusted under 35 U.S.C. 154(b) by 0 days.

(21) Appl. No.: 17/252,597

(22) PCT Filed: Oct. 13, 2018

(86) PCT No.: PCT/CN2018/110162
§ 371 (c)(1),
(2) Date: Dec. 15, 2020

(87) PCT Pub. No.: WO2019/237603
PCT Pub. Date: Dec. 19, 2019

(65) Prior Publication Data
US 2021/0274288 A1 Sep. 2, 2021

(30) Foreign Application Priority Data
Jun. 15, 2018 (CN) .......................... 201810621643.6

(51) Int. Cl.
*H04R 9/06* (2006.01)
*H04R 7/10* (2006.01)
*H04R 9/02* (2006.01)
*B32B 7/12* (2006.01)
(Continued)

(52) U.S. Cl.
CPC .................. *H04R 9/06* (2013.01); *B32B 7/12* (2013.01); *B32B 27/08* (2013.01); *B32B 27/36* (2013.01); *H04R 7/10* (2013.01); *H04R 9/025* (2013.01); *H04R 2307/025* (2013.01)

(58) Field of Classification Search
CPC ........ H04R 2307/025; H04R 2307/504; H04R 7/10; B32B 27/36; B32B 7/12
See application file for complete search history.

(56) References Cited

U.S. PATENT DOCUMENTS

| | | | | |
|---|---|---|---|---|
| 4,859,523 A | * | 8/1989 | Endoh ..................... | B32B 15/08 428/215 |
| 2003/0059606 A1 | * | 3/2003 | Iijima ................... | C09J 167/025 428/480 |
| 2011/0026757 A1 | * | 2/2011 | Takahashi ............ | H04R 31/003 381/397 |

FOREIGN PATENT DOCUMENTS

| | | |
|---|---|---|
| CN | 202652511 U | 1/2013 |
| CN | 105188000 A * | 12/2015 |
| CN | 105188000 A | 12/2015 |

(Continued)

*Primary Examiner* — Sunita Joshi
(74) *Attorney, Agent, or Firm* — Baker Botts, L.L.P.

(57) ABSTRACT

A speaker is disclosed, which comprises a vibration system and a magnetic circuit system cooperating with the vibration system. The vibration system includes a speaker diaphragm, the speaker diaphragm comprises two surface layers compounded together and at least one intermediate layer positioned between the two surface layers, at least one of the surface layers is a thermoplastic polyester elastomer film layer, the at least one intermediate layer is an adhesive layer, the speaker diaphragm has Young's modulus of 5-700 MPa and an amplitude of 0.25 mm-1 mm, and the speaker has $F_0$ of 150-1500 Hz. The speaker has a good sounding effect.

16 Claims, 5 Drawing Sheets

(51) Int. Cl.
    *B32B 27/08*    (2006.01)
    *B32B 27/36*    (2006.01)

(56) References Cited

FOREIGN PATENT DOCUMENTS

| | | |
|---|---|---|
| CN | 108551640 A | 9/2018 |
| CN | 108551641 A | 9/2018 |
| CN | 108551642 A | 9/2018 |
| CN | 108551643 A | 9/2018 |
| CN | 108566608 A | 9/2018 |
| CN | 109005487 A | 12/2018 |

\* cited by examiner

SPEAKER

CROSS-REFERENCE TO RELATED APPLICATION

This application is a National Stage of International Application No. PCT/CN2018/110162, filed on Oct. 13, 2018, which claims priority to Chinese Patent Application No. 201810621643.6, filed on Jun. 15, 2018, both of which are hereby incorporated by reference in its entirety.

TECHNICAL FIELD

The present invention relates to the field of electro-acoustic conversion, and more specifically to a speaker.

BACKGROUND

A speaker usually includes a housing, a vibration system and a magnetic circuit system. The vibration system includes a voice coil and a diaphragm with a central part thereof connected to one end of the voice coil. An edge of the diaphragm is fixed on the housing. A magnetic circuit system is provided in the housing and includes permanent magnets to form a magnetic gap. The other end of the voice coil is inserted into the magnetic gap. The voice coil vibrates under a magnetic field force in the magnetic gap, in response to an electric signal from an external circuit. The voice coil drives the diaphragm to vibrate and generate sound.

Most existing speaker diaphragms adopt a composite structure of high modulus plastic base layers (PEEK, PAR, PEL, PI, etc.), soft thermoplastic polyurethane elastomer (TPU) and damping film (acrylic glue, silica gel, etc.). However, the above-mentioned diaphragms are poor in overall performance and are likely to cause poor listening effect.

With the increasing demand on high power, waterproof and high sound quality, diaphragms made from silicone rubber have also been applied in the field of speakers. However, silicone rubber is relatively low in its modulus or hardness, and requires a diaphragm made therefrom to be thicker for the same $F_0$. This leads to a reduced space allowance for vibration on one hand and a heavy weight of the vibration system on the other hand, resulting in a low sensitivity.

Therefore, it is necessary to provide a new technical solution to solve the above technical problems.

SUMMARY

An object of the present invention is to provide a new technical solution for a speaker.

According to the first aspect of the present application, a speaker is provided. The speaker comprises a vibration system including a speaker diaphragm and a magnetic circuit system cooperating with the vibration system, the speaker diaphragm comprises two surface layers compounded together and at least one intermediate layer positioned between two surface layers, at least one of the surface layers is a thermoplastic polyester elastomer film layer, the at least one intermediate layer is an adhesive layer, the speaker diaphragm has Young's modulus of 5-700 MPa and an amplitude of 0.25 mm-1 mm, and the speaker has $F_0$ of 150-1500 Hz.

Optionally, the speaker diaphragm has a thickness of 10-100 μm, the thermoplastic polyester elastomer film layer has a thickness of 5-70 μm, and the adhesive layer has a thickness of 1-40 μm.

Optionally, the amplitude of the speaker diaphragm is 0.4 mm-0.6 mm.

Optionally, the thermoplastic polyester elastomer is a copolymer composed of a hard segment A of polyester and a soft segment B of polyether or aliphatic polyester, and the soft segment B of polyether or aliphatic polyester is made from a material selected from one or more of aliphatic polyester, polyethylene oxide, polypropylene oxide, polytetrahydrofuran ether, and polyphenylene ether;

the hard segment A of polyester is made from a polymer of dibasic acid and dihydric alcohol, wherein the dibasic acid is selected from one or more of terephthalic acid, isophthalic acid, naphthalenedicarboxylic acid and biphenyldicarboxylic acid, and the the dihydric alcohol is selected from one or more of ethylene glycol, propylene glycol, butylene glycol, pentanediol, and hexylene glycol.

Optionally, the hard segment A of polyester has a mass percentage of 10-95%, and the soft segment B of polyether or aliphatic polyester is made from a material having a relative molecular mass of 600-6000.

Optionally, the hard segment A of polyester can be crystallized, is made from a material having an average polymerization degree greater than or equal to 2, and has a melting temperature greater than or equal to 150° C.

Optionally, the adhesive layer and the thermoplastic polyester elastomer film layer have an adhesive force therebetween greater than 100 g/25 mm (180° peeling).

Optionally, the adhesive layer has a loss factor greater than or equal to 0.1.

Optionally, the thermoplastic polyester elastomer film layer has a loss factor greater than or equal to 0.015.

Optionally, the speaker diaphragm is of a three-layer structure comprising one intermediate layer, and two surface layers are the thermoplastic polyester elastomer film layers.

Optionally, the speaker diaphragm comprises two intermediate layers, the two surface layers are the thermoplastic polyester elastomer film layers, and the two intermediate layers are adhesive layers made from different materials.

Optionally, the speaker diaphragm comprises three intermediate layers, wherein two of the intermediate layers are adhesive layers and the other intermediate layer is the thermoplastic polyester elastomer film layer, and the thermoplastic polyester elastomer film layer is located between the two adhesive layers; or the three intermediate layers are the adhesive layers.

Optionally, the two surface layers have the same thickness.

According to an embodiment of the present disclosure, the speaker has a good sound generation result.

Other features and advantages of the present invention will become apparent from the following detailed description of exemplary embodiments of the present invention with reference to the accompanying drawings.

BRIEF DESCRIPTION OF THE DRAWINGS

The drawings incorporated in and constituting a part of the specification illustrate the embodiments of the present invention, and together with the description thereof, serve to explain the principles of the present invention.

DESCRIPTION OF REFERENCE SIGNS

Figure 1A:
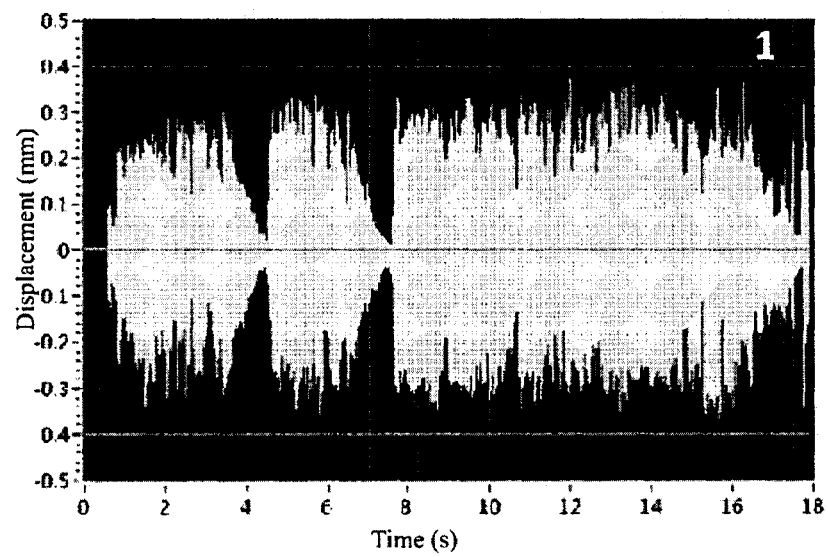
FIG. 1A is a SmartPA (smart power amplifier) test curve of a conventional diaphragm.

11: thermoplastic polyester elastomer film layer; 12: adhesive layer; 12*a*: another adhesive layer; 13: central portion: 14: FPCB; 16: connecting portion; 17: corrugated rim.

DETAILED DESCRIPTION

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail, but where appropriate, the techniques, methods, and apparatus should be considered as part of the description.

Among all the examples shown and discussed herein, any specific value should be construed as illustrative rather than limiting. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

According to an embodiment of the present invention, a speaker diaphragm is provided. The diaphragm can be a single-layer structure or a composite structure composed of a plurality of membrane layers.

The diaphragm includes a thermoplastic polyester elastomer film layer. The thermoplastic polyester elastomer is a copolymer composed of a hard segment A of polyester and a soft segment B of polyether or aliphatic polyester.

Specifically, the copolymer is formed by transesterification reaction between polyester material and polyether or aliphatic polyester material under the action of a set catalyst. The copolymer is a polymer prepared by linking two or more polymer segments with different properties together. Due to the inherent incompatibility between the various components of the copolymer, each component self-assembles into an ordered nanostructure on the nanoscale and forms a microphase separation, so the copolymer exhibits the characteristics of having properties of different polymer segments.

For example, the raw material of copolymer used to make the diaphragm is in the form of particles, powder, etc. When making the diaphragm, the raw material is heated and turned into fluid. With the fluid, a film layer is formed by injection molding, casting molding, etc.

The hard segment A of polyester herein has higher hardness and serves as a structural support, ensuring sufficient rigidity of the thermoplastic polyester elastomer film layer. The soft segment B of polyether or aliphatic polyester has strong fluidity and provides compliance for the film layer, which makes the thermoplastic polyester elastomer film layer have good resilience and a low thermoplastic temperature, for example, reaching 50° C.-200° C. The speaker diaphragm has a low molding temperature and is easier to process.

The higher the mass fraction of the hard segment A of polyester, the higher the hardness of the formed speaker diaphragm, but the speaker diaphragm increases in brittleness and is easy to break. By contrast, the lower the mass fraction of hard segment A of the polyester, the more difficult for the hard segment A of polyester to form crystals; this leads to soft texture and low hardness of the thermoplastic polyester elastomer film and deteriorated toughness and resilience of the speaker diaphragm.

In an example, the mass percentage of the material of the hard segment A of polyester is 10-95%, that is, a percentage of the amount of the material of the hard segment A of polyester accounting for a total reactant mass, i.e., the total mass of the material of the hard segment A of polyester and the material of the soft segment B of aliphatic polyester. This range enables the speaker diaphragm to accommodate hardness, toughness and resilience performance at the same time.

Preferably, the mass percentage of the material of the hard segment A of polyester is 30-90%, which range enables the speaker diaphragm to be thinner and the hardness, toughness, and resilience performance thereof to be better.

Optionally, the hard segment A of polyester is made from a polymer of dibasic acid and dihydric alcohol. The hard segment A of polyester is formed by dibasic acid and the dihydric alcohol undergoing polymerization reaction under a set reaction condition. It is easy for polymer to react with the material of the soft segment B of polyether or aliphatic polyester to form a thermoplastic elastomer polymer.

For example, the dibasic acid is selected from one or more of terephthalic acid, isophthalic acid, naphthalenedicarboxylic acid and biphenyldicarboxylic acid. The above-mentioned dibasic acid and the dihydric alcohol have a fast reaction speed and a high conversion rate.

For example, the dihydric alcohol is selected from one or more of ethylene glycol, propylene glycol, butylene glycol, pentanediol, and hexylene glycol. The above-mentioned dibasic acid and the dihydric alcohol have a fast reaction speed and a high conversion rate.

Of course, the types of dibasic acids and dihydric alcohol are not limited to the foregoing embodiments, and can be selected by those skilled in the art according to actual needs.

In this example, the hard segment A of polyester can be crystallized, and it has an average polymerization degree greater than or equal to 2. With this average polymerization degree, the hard segment A of polyester has a good crystallization property, such that the speaker diaphragm has high rigidity, high structural strength, and good durability.

In an example, the hard segment A of polyester has a melting temperature greater than or equal to 150° C. The melting temperature refers to a temperature at which a material changes from a solid phase to a liquid phase. The melting temperature of the hard segment A of polyester determines a melting temperature of the thermoplastic polyester elastomer. The higher the melting temperature, the wider the use temperature range of the thermoplastic polyester elastomer. The range of the melting temperature enables the application temperature range of the speaker diaphragm to be wider and to work normally in a working environment with a higher temperature.

Optionally, the soft segment B of polyether or aliphatic polyester is made from a material selected from one or more of aliphatic polyester, polyethylene oxide, polypropylene oxide, polytetrahydrofuran ether, and polyphenylene ether. This enables excellent fluidity of the thermoplastic polyester elastomer and thus enables both good compliance and good flexibility of the speaker diaphragm.

In addition, it is easy for the above-mentioned materials to polymerize with the material of the hard segment A of polyester, thereby making the speaker diaphragm easy to process.

Optionally, the material of the soft segment B of polyether or aliphatic polyester has a relative molecular mass of 600-6000. The lower the relative molecular mass of the soft segment B of polyether or aliphatic polyester, the more severe the soft segment B of polyether or aliphatic polyester is dispersed by the hard segment A of polyester, thus the diaphragm exhibits higher brittleness and has poor toughness and resilience; the higher the relative molecular mass of the soft segment B of polyether or aliphatic polyester, the higher the hardness, and its properties are getting closer and closer to the hard segment A of polyester, which makes the speaker diaphragm have a worse elasticity and a small elongation of broken chain. The range of the relative molecular mass enables the speaker diaphragm to have sufficient rigidity and toughness, as well as a higher tensile strength and elongation of broken chain.

In an example, the thermoplastic polyester elastomer film layer has a thickness of 5-70 µm. The smaller the thickness of the thermoplastic polyester elastomer, the speaker diaphragm is insufficient in rigidity, and thus the polarization is likely to occur during vibration; on the contrary, if the thickness is too large, the formed vibration system would have a reduced space allowance for vibration and an increased weight, degrading the sensitivity of the formed vibration system. This thickness range enables the speaker diaphragm to accommodate both higher stiffness and sensitivity, and enlarges space allowance for vibration of the vibration system.

Further, the thermoplastic polyester elastomer film layer has a thickness of 5-40 µm. This thickness range makes the speaker diaphragm more sensitive, likewise makes it possible to drive the power diaphragm with large amplitude and large loudness, and enlarges space allowance of vibration of the vibration system.

In addition to providing stiffness in the speaker diaphragm, the thermoplastic polyester elastomer film layer can also provide some damping performance. This is due to the following reasons: the thermoplastic polyester elastomer film layer is composed of the hard segment A of polyester and the soft segment B of polyether or aliphatic polyester but the molecular segments of the soft segment B of polyether or aliphatic polyester can move at room temperature but the molecular segments of the hard segment A of polyester will subject to large frictional damping at room temperature, thus exhibiting good damping characteristics.

A loss factor can characterize the damping property of a material, and the thermoplastic polyester elastomer film layer has a loss factor greater than or equal to 0.015. It indicates that the damping property of the speaker diaphragm is improved, the vibration system has a strong ability to suppress polarization phenomenon during vibration, and the vibration consistency is good. The commonly used engineering plastic film layer has low damping with a loss factor generally less than 0.01, and the damping property thereof is small.

Compared with engineering plastics, the thermoplastic polyester elastomer film layer makes the speaker diaphragm have a wider elastic area and good resilience. In an example, the thermoplastic polyester elastomer film layer after 10% strain has an elastic recovery rate greater than or equal to 80%. Due to the good resilience of the speaker diaphragm, the speaker has a better transient response and a lower distortion.

Commonly used engineering plastic diaphragms, such as PEEK, have a yield point of about 5%, while the thermoplastic polyester elastomer has no yield point or has a yield point greater than 10% since it is in a high elastic state at room temperature with good resilience and the material will not yield significantly when under force.

Figure 8:
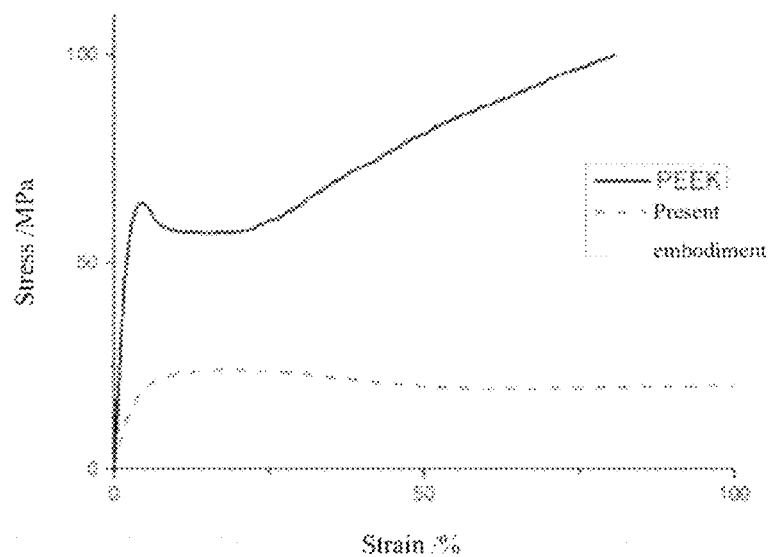
FIG. 8 are stress-strain curves of a speaker diaphragm according to an embodiment of the present invention and a PEEK diaphragm.

FIG. 8 shows stress-strain curves of a speaker diaphragm according to an embodiment of the present invention and a PEEK diaphragm.

The dotted line is the stress-strain curve of the speaker diaphragm provided by the embodiment of the present invention; the solid line is the stress-strain curve of the PEEK diaphragm.

It can be seen from FIG. 8 that under the same stress, the speaker diaphragm provided by the embodiment of the present invention has a strain significantly greater than that of the PEEK diaphragm. This indicates that the speaker diaphragm provided by the embodiment of the present invention has a Young's modulus significantly smaller than that of the PEEK diaphragm.

In addition, the PEEK diaphragm has an obvious yield point, which is at about 0.4-0.5% strain. However, the speaker diaphragm provided by the present invention has no obvious yield point and the strain when yielding is greater than 10%. This indicates that the speaker diaphragm provided by the present invention has a wider elastic area and excellent resilience performance.

The thermoplastic polyester elastomer film layer makes the speaker diaphragm have good flexibility, for example, elongation at break being greater than or equal to 300%. The materials of the hard segment A of polyester and the soft segment B of polyether or aliphatic polyester have an important influence on the elongation at break, and may be selected by those skilled in the art according to actual needs. This makes the speaker diaphragm have a larger vibration displacement and a greater loudness, and have good reliability and durability. The better the flexibility of the material and the greater the elongation at break, the stronger the ability of the speaker diaphragm to resist damage. When the speaker diaphragm vibrates in a state of large amplitude, the material will produce a relatively large strain, and there is a risk of folding the diaphragm, cracking the diaphragm or damaging the diaphragm during long-term vibration. The speaker diaphragm with the thermoplastic polyester elastomer film layer as the base material has good flexibility, thus reducing the risk of damaging the diaphragm.

The glass transition temperature of the thermoplastic polyester elastomer film layer can be adjusted by adjusting the ratio of the material of the hard segment A of polyester to the material of the soft segment B of polyether or aliphatic polyester material. For example, the mass percentage of the hard segment A of polyester is 10-95%. This makes the glass transition temperature of the thermoplastic polyester elastomer film layer ≤20° C. The glass transition temperature enables the speaker diaphragm to maintain a high elastic state at room temperature and has a good resilience.

Preferably, the glass transition temperature of the thermoplastic polyester elastomer film layer is −90° C.-0° C. This allows the speaker diaphragm to always maintain better rubber elasticity when it works below 0° C., such that the speaker exhibits a higher sound quality. At the same time, the speaker diaphragm has a reduced risk of being damaged in a low temperature environment and a higher reliability.

The speaker diaphragm of the embodiment of the present invention can meet the needs of the speaker for use in high and low temperature environments. The performance at low temperature is more prominent than conventional diaphragms, such as PEEK diaphragm. When used in a low-temperature environment, the diaphragm of the embodiment of the present invention still has good strength and toughness, and low risk of damaging the diaphragm in a low-temperature environment for a long term.

In an example, the thermoplastic polyester elastomer film layer has a Young's modulus of 1-1000 MPa. Under other conditions being determined, the Young's modulus is proportional to $F_0$ (resonant frequency) of the speaker. The thermoplastic polyester elastomer film layer makes the Young's modulus of the speaker lower, thereby obtaining a lower $F_0$, and thus improving the low-frequency effect of the speaker.

The speaker diaphragm has a low Young's modulus and good thermal plasticity, which allows the speaker diaphragm to be made very thin, reduces the weight of the speaker diaphragm, enlarges space allowance for vibration, improves the sensitivity, and makes the $F_0$ of the speaker lower.

The speaker diaphragm has a wider elastic area and an excellent resilience performance.

Further, the thermoplastic polyester elastomer film layer has a Young's modulus of 2-700 MPa. As such, the $F_0$ of the speaker can be further reduced. The types and proportions of the material of the hard segment A of polyester and the material of the soft segment B of polyether or aliphatic polyester can be adjusted by those skilled in the art according to the sound generation requirements of different speaker diaphragms to achieve a suitable Young's modulus.

In an example, the speaker diaphragm is a composite structure. The composite structure includes two surface layers compounded together and at least one intermediate layer located between the two surface layers. At least one surface layer is a thermoplastic polyester elastomer film layer, and at least one intermediate layer is an adhesive layer.

The adhesive layer provides the damping property and adhesion property required by the speaker diaphragm. The adhesive layer can be directly bonded with the thermoplastic polyester elastomer film layer to form a composite structure. This makes the speaker diaphragm very easy to manufacture.

The loss factor can reflect the magnitude of damping property. In an example, the adhesive layer has a loss factor greater than or equal to 0.1. The adhesive layer can effectively suppress the polarization of the needle-shaped system when it vibrates, such that the vibration consistency becomes better, thereby improving the hearing effect.

In an example, the adhesive force between the adhesive layer and the thermoplastic polyester elastomer film layer is greater than 10 g/25 mm (180° peeling). The high adhesive force makes the upper and lower film layers of the adhesive layer have a good coordination and consistency during vibration, the sound quality be pure, and the speaker diaphragm still maintain the original state after long-term vibration and thus have a high property stability.

Optionally, the adhesive layer is selected from one or more of acrylic adhesives, silicone adhesives and polyurethane adhesives. The above-mentioned adhesives have good adhesion and damping property. Those skilled in the art can make selections according to actual needs.

In this example, the adhesive layer has a thickness of 1-40 μm. The adhesive force of the adhesive layer increases as the thickness of the adhesive layer increases. If the thickness is too small, the adhesive force will be insufficient, and the consistency of the movement of the upper and lower surface layers of the adhesive layer cannot be effectively guaranteed during vibration. At the same time, the damping effect provided by the adhesive layer will also decrease as the thickness decreases. If the thickness of the adhesive layer is too large, then on the one hand the space allowance for vibration will be reduced; and on the other hand the edges of the speaker diaphragm prone to problems such as glue overflow, which affects the process yield. The adhesive layer in this thickness range can take into account sufficient adhesive force, excellent damping effect and sufficient space allowance for vibration of the vibration system. Further preferably, the adhesive layer has a thickness of 2-35 μm.

Figure 2:
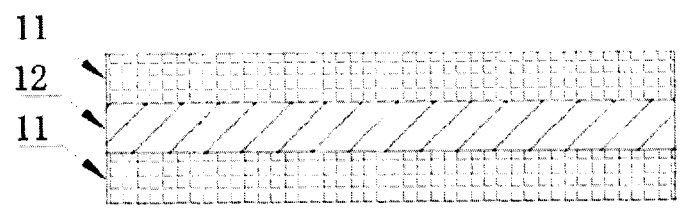
FIGS. 2-4 are cross-sectional views of a speaker diaphragm according to an embodiment of the present invention.

Preferably, the speaker diaphragm has a thickness of 10-100 μm. This thickness range enables the vibration system to have sufficient space allowance for vibration, and is conducive to the thin and miniaturized design of the speaker In an example, as shown in FIG. 2, the speaker diaphragm has a three-layer structure, which includes an intermediate layer. The middle layer is the adhesive layer 12. The two surface layers are thermoplastic polyester elastomer film layers 11. The speaker diaphragm has a strong rigidity and a good damping effect.

In addition, the speaker diaphragm has fewer layers, can be made thinner, and has a higher vibration sensitivity.

In an example, the surface layers are thermoplastic polyester elastomer film layers 11. This makes the hardness, toughness and resilience of the speaker diaphragm better. Since the materials of the two surface layers of the diaphragm are uniform, the diaphragm has more excellent durability.

Figure 3:
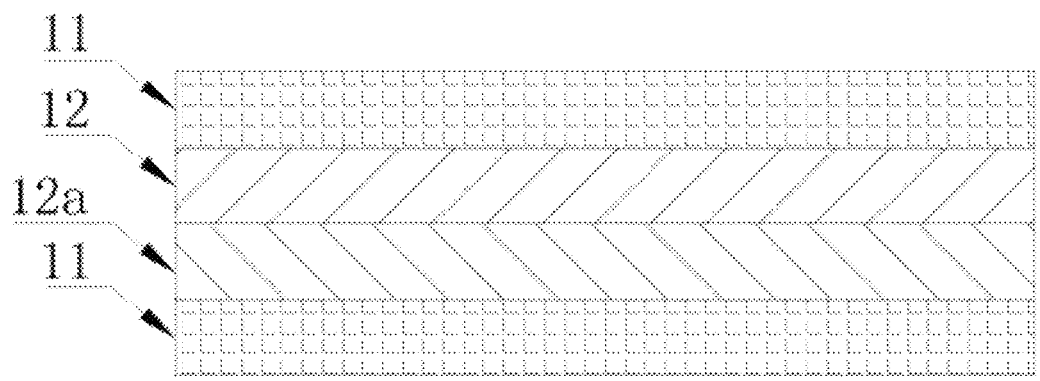

In an example, the speaker diaphragm includes two intermediate layers. The two surface layers are thermoplastic polyester elastomer film layers 11. The two intermediate layers are adhesive layers 12, 12a made from different materials, as shown in FIG. 3.

The speaker diaphragm has a strong rigidity and a good damping effect.

Figure 4:
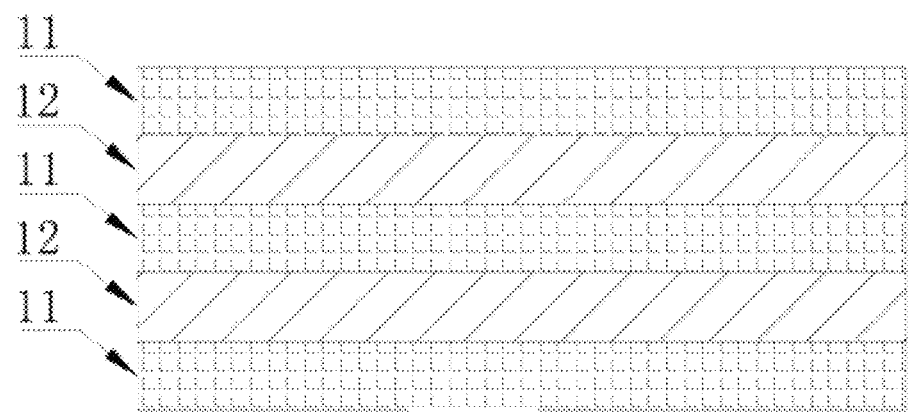

In an example, the speaker diaphragm includes three intermediate layers. The two surface layers are thermoplastic polyester elastomer film layers 11. As shown in FIG. 4, the two intermediate layers are adhesive layers 12, the other intermediate layer is a thermoplastic polyester elastomer film layer 11, and the thermoplastic polyester elastomer film layer 11 is located between the two adhesive layers 12. The thermoplastic polyester elastomer film layer 11 and the adhesive layer 12 are alternately arranged with each other.

The three intermediate layers are adhesive layers 12.

The speaker diaphragm has a strong rigidity, a good damping effect and a good resilience.

Optionally, a plurality of thermoplastic polyester elastomer film layers may have the same or different Young's modulus. When the Young's modulus is the same, each thermoplastic polyester elastomer film layer may have better vibration consistency. When the Young's modulus is different, it can be adjusted to adapt the difficulty of upward and downward vibration of the speaker diaphragm, optimizing the vibration balance.

In addition, a plurality of thermoplastic polyester elastomer film layers and adhesive layers may have the same or different loss factors, thicknesses, etc. The above parameters can be adjusted by those skilled in the art so as to adjust the rigidity, damping characteristics, compliance, resilience, etc. of the speaker diaphragm.

Preferably, the two surface layers have the same thickness, which makes the speaker diaphragm have a good uniformity and is not easy to curl or wrinkle.

When the thermoplastic polyester elastomer mold layer is compounded with the adhesive layer, the Young's modulus of the thus formed speaker diaphragm will change accordingly. The smaller Young's modulus of the adhesive layer will reduce the Young's modulus of the speaker diaphragm. For example, the thermoplastic polyester elastomer film layer has a Young's modulus of 1-1000 MPa, and the compounded speaker diaphragm has a Young's modulus of 5-600 MPa.

In other examples, one of the two surface layers is a thermoplastic polyester elastomer film layer, and the other is a film layer made from another material, such as a silicone rubber layer, an engineering plastic layer, and the like. A plurality of film layers are bonded together by an adhesive layer. In this way, the speaker diaphragm also has the good physical and acoustic properties.

Figure 7:
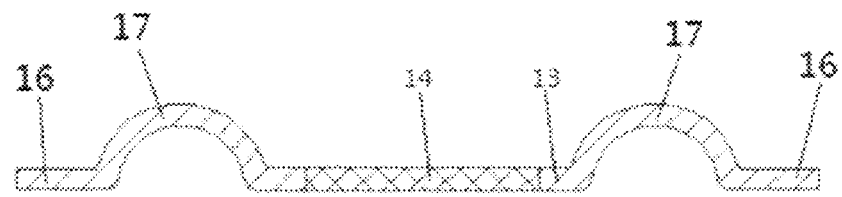
FIG. 7 is a cross-sectional view of a speaker diaphragm according to an embodiment of the present invention.

In an example, as shown in FIG. 7, the speaker diaphragm is a corrugated rim diaphragm, which includes a corrugated rim 17, a central portion 13 formed by the inner edge of the corrugated rim 17 extending inwardly, and a connecting portion 16 formed by the outer edge of the corrugated rim 17 extending outward. For example, the central portion 13 is provided with a reinforcing layer, which can increase the structural strength of the speaker diaphragm and reduce the partition vibration of the speaker diaphragm. The central portion 13 is connected to one end of the voice coil. The connecting portion 16 is used to connect with the housing of the speaker. The corrugated rim 17 has a thickness configured to gradually increase from the apex thereof toward a portion close to the central portion 13 and the connecting portion 16.

The apex is the highest point or the lowest point of the cross section of the corrugated rim 17 in the radial direction. In this way, since the thickness near the apex is smaller, the speaker diaphragm may have a higher vibration sensitivity. Since the thickness of the portion close to the central portion 13 and the connecting portion 16 is large, the diaphragm may have an improved structural strength.

In an example, as shown in FIG. 7, the reinforcing layer is FPCB 14. The FPCB 14 is embedded in the central portion 13. The FPCB 14 includes a conductive metal layer and insulating layers covering the upper and lower sides of the conductive metal layer. The conductive metal layer makes the FPCB 14 have a higher strength, and the insulating layer makes the FPCB 14 have a stronger toughness. FPCB 14 can effectively reduce the partition vibration of the speaker diaphragm.

In addition, the wire-out end and the wire-in end of the voice coil are connected to the FPCB 14, and are conducted with the external circuit through the FPCB 14. It makes the voice coil have an easier and high reliable electrical connection.

Figure 1B:
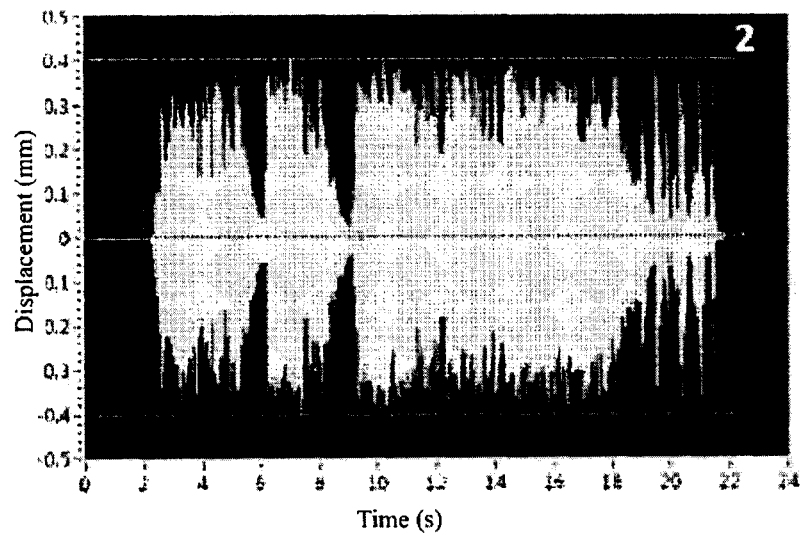
FIG. 1B is a SmartPA test curve of a speaker diaphragm according to an embodiment of the present invention.

FIG. 1A is a SmartPA (smart power amplifier) test curve of a conventional diaphragm. FIG. 1B is a SmartPA test curve of a speaker diaphragm according to an embodiment of the present invention.

The abscissa is the test time (s), and the ordinate is the displacement (mm).

It should be noted that, in the embodiment of the present invention, the conventional diaphragm and the diaphragm in the embodiment of the present invention have the same structure but are made from different materials. For example, both the conventional diaphragm and the diaphragm in the embodiment of the present invention are three-layer structures, and the conventional diaphragm includes two PEEK surface layers and an adhesive layer located between the two surface layers. The diaphragm of the embodiment of the present invention is also a three-layer structure, including two thermoplastic polyester elastomer surface layers and an adhesive layer located between the two surface layers. The corresponding adhesive layers of the two diaphragms have the same thickness and structure. The two diaphragms are connected with the same voice coil and the same magnetic circuit system. Both the structure of the conventional diaphragm and the diaphragm structure of the present invention that are compared in the following embodiments adopt the same structure as that in this embodiment, and will not be repeated.

When an audio signal is input to the speaker, it can be known according to $F=BIL$ that the voice coil will be subjected to the same electromagnetic field force provided that the design of the voice coil and the magnetic circuit system is fixed (the BL value is fixed), the driving force applied to the diaphragm from the voice coil is the same.

However, since the Young's modulus of PEEK is much greater than that of the diaphragm of the embodiment of the present invention, the diaphragm of the embodiment of the present invention is more prone to elastic deformation under the same force, so as to achieve the desired displacement. It can be known from the SmartPA test curves of the two diaphragms that when the same music is played, the diaphragm of the embodiment of the present invention has a greater displacement during vibration, and thus a greater loudness can be obtained.

Figure 5:
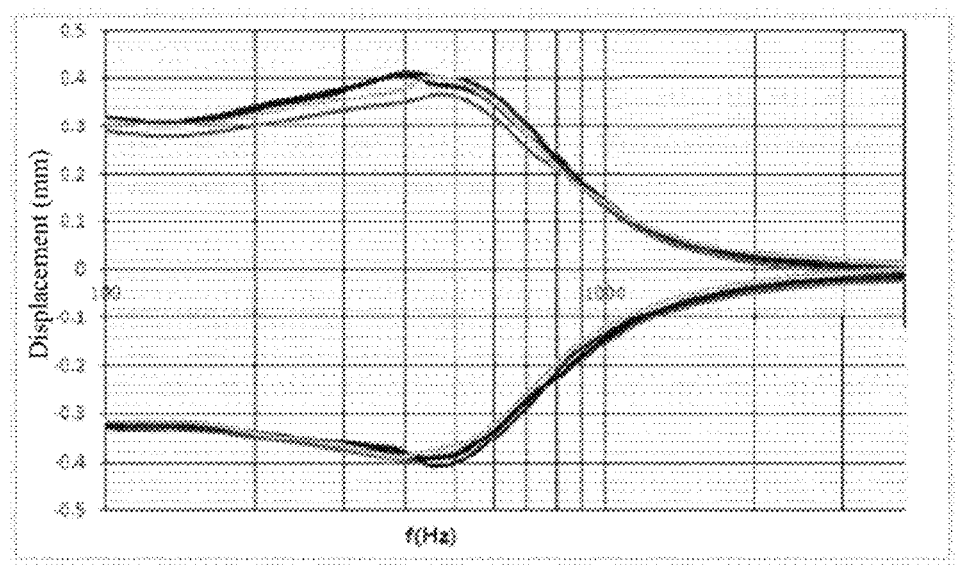
FIG. 5 are test curves of the vibration displacements of different parts of the speaker diaphragm according to an embodiment of the present invention at different frequencies.
Figure 6:
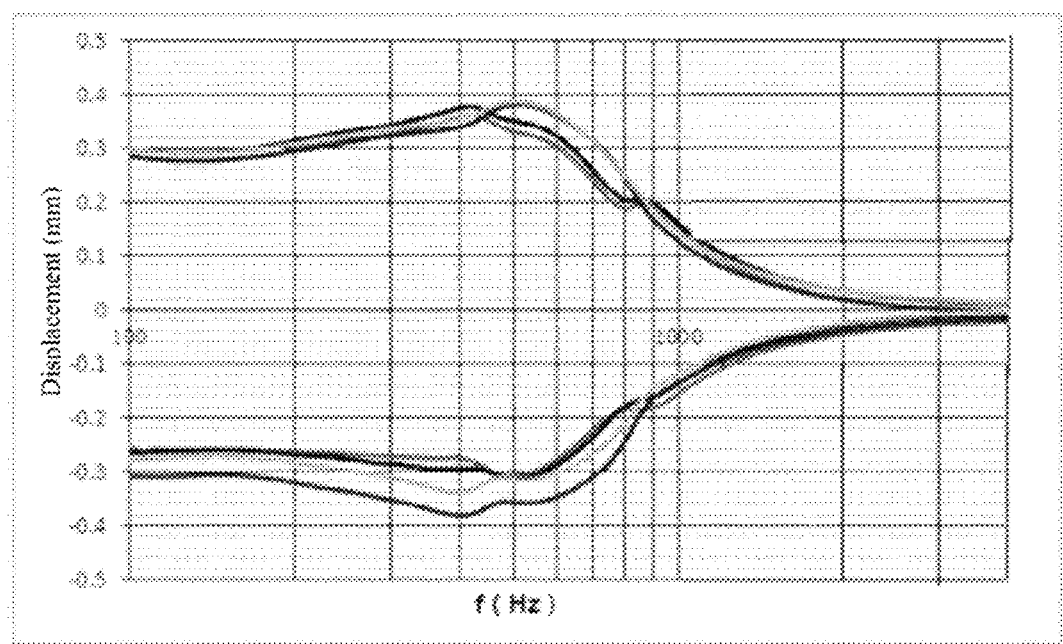
FIG. 6 are test curves of the vibration displacements of different parts of a conventional diaphragm at different frequencies.

FIG. 5 are test curves of the vibration displacements of different parts of a speaker diaphragm according to an embodiment of the present invention at different frequencies. FIG. 6 are test curves of the vibration displacements of different parts of a conventional diaphragm at different frequencies.

The diaphragm is a rectangular corrugated rim diaphragm. The abscissa is the frequency (Hz), and the ordinate is the loudness displacement (mm). The tests are performed at the edge position and the center position of the central portion of the diaphragm.

It can be seen that the curves in FIG. 5 are more concentrated while the curves in FIG. 6 are more scattered. It indicates that the speaker diaphragm of the embodiment of the present invention has better vibration consistency at each part thereof, really less swing during vibration, as well as better sound quality and hearing stability.

Figure 9:
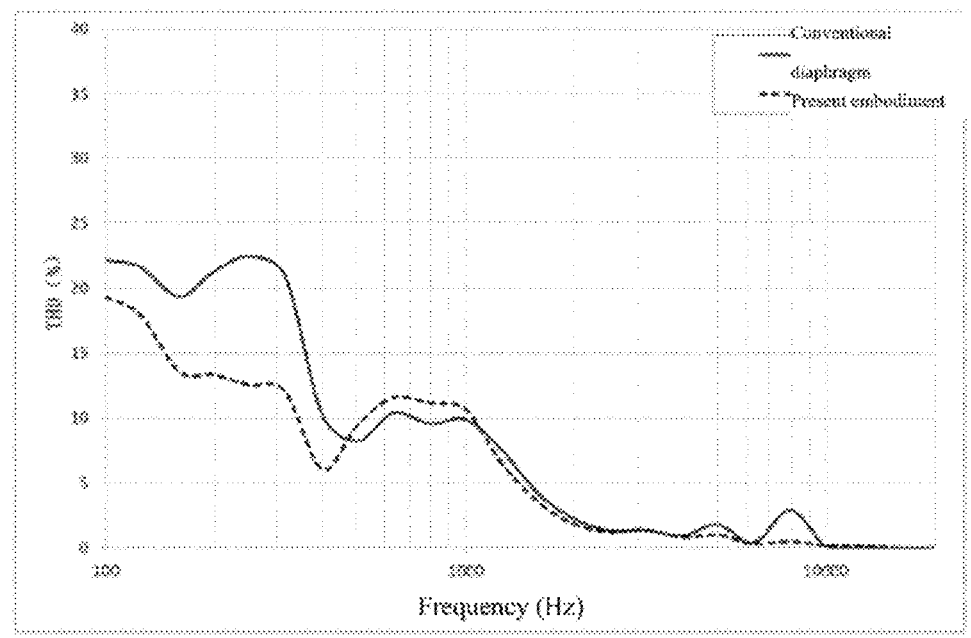
FIG. 9 are test curves of harmonic distortion of a speaker diaphragm according to an embodiment of the present invention and a conventional diaphragm.

FIG. 9 are total harmonic distortion test curves of a speaker diaphragm according to an embodiment of the present invention and a conventional diaphragm. The diaphragm is a corrugated rim diaphragm. The abscissa is the frequency (Hz), and the ordinate is the total harmonic distortion THD (%).

The dotted line is the total harmonic distortion test curve of the speaker diaphragm provided by the embodiment of the present invention. The solid line is the total harmonic distortion test curve of the conventional PEEK diaphragm.

It can be seen from FIG. 9 that the speaker diaphragm of the embodiment of the present invention has a lower THD (total harmonic distortion) compared to the PEEK diaphragm, and has no spikes and the like. It indicates that the speaker diaphragm of the embodiment of the present invention has a better anti-polarization ability and a better sound quality.

Figure 10:
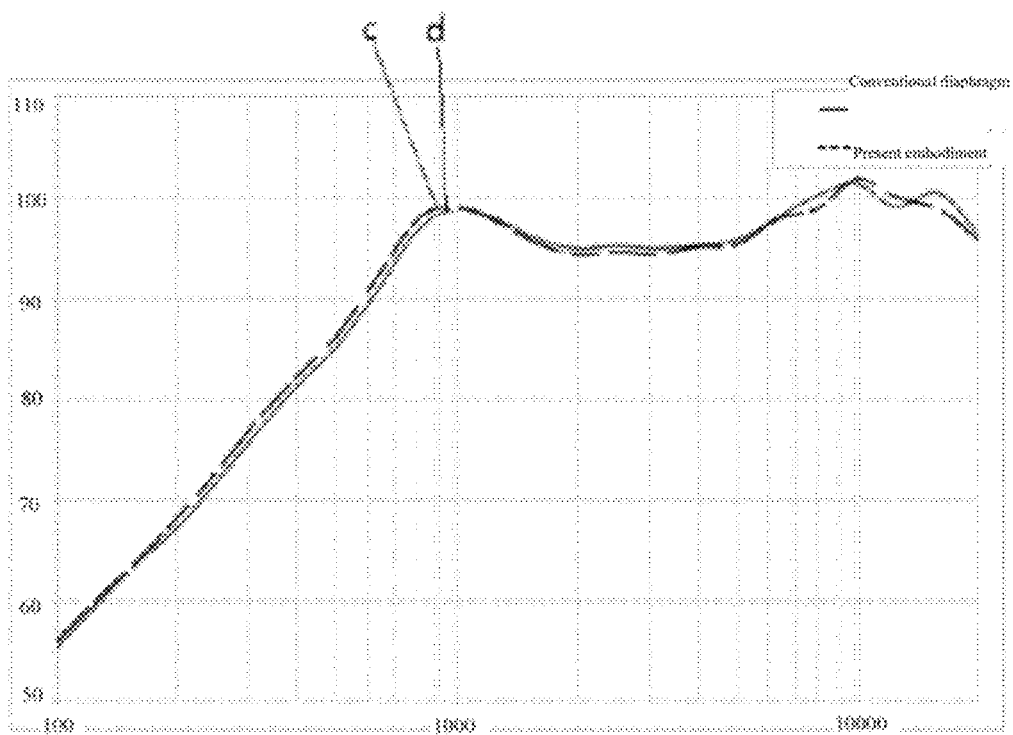
FIG. 10 are test curves of loudness (SPL curve) of a speaker diaphragm according to an embodiment of the present invention and a conventional diaphragm at different frequencies.

FIG. 10 are test curves (SPL curve) of loudness of a speaker diaphragm according to an embodiment of the present invention and a conventional diaphragm at different frequencies. The diaphragm is a corrugated rim diaphragm. The abscissa is frequency (Hz), and the ordinate is loudness.

The dotted line is the test curve of the speaker diaphragm provided by the embodiment of the present invention. The solid line is the test curve of the conventional PEEK diaphragm.

As can be seen from FIG. 10, it can be seen from the SPL curve that the mid-frequency performance of the two speaker diaphragms is similar. The $F_0$ of the speaker adopting the diaphragm of the embodiment of the present invention is 815 Hz, at "c" in FIG. 10, and the $F_0$ of the speaker adopting PEEK diaphragm is 860 Hz, at "d" in FIG. 10. It indicates that the low frequency sensitivity of the speaker diaphragm of the embodiment of the present invention is higher than that of the PEEK diaphragm. In other words, the speaker adopting the speaker diaphragm of the embodiment of the present invention has higher loudness and comfort.

According to another embodiment of the present invention, a speaker is provided. The speaker includes a vibration system and a magnetic circuit system that cooperates with the vibration system. The vibration system includes the speaker diaphragm provided by the present invention. For example, the diaphragm is a corrugated rim diaphragm or a flat plate diaphragm. The speaker has the characteristics of good sound generation result and good durability.

The $F_0$ of the speaker is proportional to the Young's modulus and thickness, and the change thereof can be achieved by changing the thickness and Young's modulus of the speaker diaphragm. The specific adjustment principle is as follows:

$$F0 = \frac{1}{2\pi}\sqrt{\frac{1}{CmsMms}}$$

wherein Mms is the equivalent vibration quality of the speaker, and Cms is the equivalent compliance of the speaker:

$$Cms = \frac{(C_{m1} * C_{m2})}{(C_{m1} + C_{m2})}$$

wherein Cms1 is damper compliance, and Cms2 is diaphragm compliance. When there is no damper in the design, the equivalent compliance of the speaker is the diaphragm compliance:

$$C_{m2} = \frac{(1-u^3)W^3}{\pi(W+dvc)t^3 E a_1 a_2}$$

wherein w is the total width of the corrugated rim of the diaphragm, t is the thickness of the diaphragm; dve is the fitting outer diameter of the diaphragm and voice coil; E is the Young's modulus of the diaphragm material; and u is the Poisson's ratio of the diaphragm material.

It can be seen that the $F_0$ of the speaker is proportional to the modulus and thickness. In order to obtain fat bass and comfortable listening, the diaphragm should have sufficient stiffness and damping while the speaker has a lower $F_0$. The $F_0$ can be adjusted by those skilled in the art by adjusting the Young's modulus and thickness of the speaker diaphragm. Preferably, the Young's modulus is 5-600 MPa. The speaker diaphragm has a thickness of 10-100 μm. This enables the $F_0$ of the speaker to reach 150-1500 Hz. The speaker has an excellent low frequency performance.

Preferably, the speaker diaphragm has an amplitude of 0.25 mm-1.0 mm. The "amplitude" described in this embodiment refers to the maximum value of deviation of the diaphragm in one direction from the equilibrium position. In this vibration range, a speaker diaphragm comprising the thermoplastic polyester elastomer film layer still has a good hearing effect. However, amplitude of engineering plastic films, such as PEEK film, generally cannot reach the above-mentioned range; even if it can reach the above-mentioned range, a good hearing effect cannot be achieved.

Further, the speaker diaphragm has an amplitude of 0.4 mm-0.6 mm. This range enables the vibration system to achieve a better listening effect and to have sufficient space allowance for vibration.

While certain specific embodiments of the present disclosure have been illustrated by way of example, it will be understood by those skilled in the art that the foregoing examples are provided for the purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. A speaker, comprising a vibration system including a speaker diaphragm and a magnetic circuit system cooperating with the vibration system, wherein the speaker diaphragm comprises two surface layers compounded together and at least one intermediate layer positioned between the two surface layers, at least one of the surface layers comprises a thermoplastic polyester elastomer film layer, the at least one intermediate layer comprises an adhesive layer, the speaker diaphragm has Young's modulus of 5-700 MPa and an amplitude of 0.25 mm-1 mm, and the speaker has F0 of 150-1500 Hz, and the thermoplastic polyester elastomer film layer has no yield point or has a yield point greater than 10%.

2. The speaker according to claim 1, wherein the speaker diaphragm has a thickness of 10-100 μm, the thermoplastic polyester elastomer film layer has a thickness of 5-70 μm, and the adhesive layer has a thickness of 1-40 μm.

3. The speaker according to claim 1, wherein the amplitude of the speaker diaphragm is 0.4 mm-0.6 mm.

4. The speaker according to claim 1, wherein the thermoplastic polyester elastomer including a copolymer composed of a hard segment A of polyester and a soft segment B of polyether or aliphatic polyester, and the soft segment B of polyether or aliphatic polyester includes one or more materials selected from the group consisting of aliphatic polyester, polyethylene oxide, polypropylene oxide, polytetrahydrofuran ether, and polyphenylene ether; the hard segment A of polyester comprises a polymer of dibasic acid and dihydric alcohol, wherein the dibasic acid is selected from the group consisting of terephthalic acid, isophthalic acid, naphthalenedicarboxylic acid and biphenyldicarboxylic acid, and the dihydric alcohol is selected from the group consisting of ethylene glycol, propylene glycol, butylene glycol, pentanedial, and hexylene glycol.

5. The speaker according to claim 4, wherein the hard segment A of polyester has a mass percentage of 10-95%, and the soft segment B of polyether or aliphatic polyester comprises a material having a relative molecular mass of 600-6000.

6. The speaker according to claim 3, wherein the hard segment A of polyester comprises a material that can be crystallized, has an average polymerization degree greater than or equal to 2, and has a melting temperature greater than or equal to 150 C.

7. The speaker according to claim 1, wherein the adhesive layer and the thermoplastic polyester elastomer film layer have an adhesive force therebetween greater than 100 g/251 mm (180° peeling).

8. The speaker according to claim 1, wherein the adhesive layer has a loss factor greater than or equal to 0.1.

9. The speaker according to claim 1, wherein the thermoplastic polyester elastomer film layer has a loss factor greater than or equal to 0.015.

10. The speaker according to claim 1, wherein the speaker diaphragm comprises a three-layer structure including one intermediate layer, and the two surface layers comprise the thermoplastic polyester elastomer film layers.

11. The speaker according to claim 1, wherein the speaker diaphragm comprises two intermediate layers, the two surface layers comprise the thermoplastic polyester elastomer film layers, and the two intermediate layers comprise adhesive layers made from different materials.

12. The speaker according to claim 1, wherein the speaker diaphragm comprises three intermediate layers, wherein a first and a second of the intermediate layers comprise adhesive layers and a third of the intermediate layers comprises the thermoplastic polyester elastomer film layer, and wherein the thermoplastic polyester elastomer film layer is located between the two adhesive layers.

13. The speaker according to claim 1, wherein the two surface layers have the same thickness.

14. The speaker according to claim 1, wherein the speaker diaphragm comprises three intermediate, wherein the three intermediate layers comprise the adhesive layers.

15. The speaker according to claim 1, wherein the thermoplastic polyester elastomer film layer has an elastic recovery rate after 10% strain being greater than or equal to 80%.

16. The speaker according to claim 1, wherein the thermoplastic polyester elastomer film layer has Young's modulus of 1-1000 MPa.

* * * * *